United States Patent [19]

Pentlow

[11] Patent Number: 4,650,625
[45] Date of Patent: Mar. 17, 1987

[54] METHOD OF FORMING AN ARTICLE IN INJECTION MOLDING APPARATUS

[75] Inventor: Stephen J. Pentlow, Market Harborough, United Kingdom

[73] Assignee: Stylo Matchmakers Intl., Ltd., United Kingdom

[21] Appl. No.: 730,914

[22] Filed: May 6, 1985

[30] Foreign Application Priority Data

May 4, 1984 [GB] United Kingdom ............... 8411550

[51] Int. Cl.⁴ .............................................. B29C 33/40
[52] U.S. Cl. ..................................... 264/225; 264/223; 264/328.1; 425/175; 425/542
[58] Field of Search ............... 264/219, 220, 223, 225, 264/226, 227, 244, 328.1; 425/542, 175

[56] References Cited

U.S. PATENT DOCUMENTS

| 2,968,840 | 1/1961 | Morse | 18/59 |
| 3,101,065 | 8/1963 | Kalis | 113/49 |
| 3,632,278 | 1/1972 | Hall | 425/450 |
| 3,850,902 | 11/1974 | Metcalfe et al. | 264/102 |
| 4,006,207 | 2/1977 | Yeshin | 264/108 |
| 4,324,748 | 4/1982 | Hatakeyama et al. | 264/51 |
| 4,451,416 | 5/1984 | Burtscher | 264/225 X |

FOREIGN PATENT DOCUMENTS

| 160751 | 1/1942 | Austria . |
| 300323 | 11/1972 | Austria . |
| 0004844 | 10/1979 | European Pat. Off. . |
| 2263584 | 9/1973 | Fed. Rep. of Germany . |
| 2210893 | 12/1974 | France . |
| 2303495 | 8/1976 | France . |
| 1033987 | 6/1966 | United Kingdom . |
| 1092749 | 11/1967 | United Kingdom . |
| 1228172 | 4/1971 | United Kingdom . |
| 1229830 | 4/1971 | United Kingdom . |
| 1384129 | 2/1975 | United Kingdom . |
| 1563997 | 4/1980 | United Kingdom . |

Primary Examiner—Jan Silbaugh
Assistant Examiner—Harold Y. Pyon
Attorney, Agent, or Firm—Pollack, Vande Sande & Priddy

[57] ABSTRACT

The invention relates to a method for forming an article by injection molding, such as a shoe, and comprises the formation of a mold (5) by coating a master pattern of the article with a pourable, heat-resistant molding compound, such as an epoxy resin or polyurethane. The master mold (5) so formed is secured in a mold casing (1) for an injection molding plant and molding material such as poly-vinyl chloride or polyurethane is injected to form the finished article. The master mold may be formed directly in the mold casing (1) to which it can be secured such as by mechanical securing and located means (6,7,8,) or by being adhered thereto. In an alternative embodiment of the invention, the master mold may be formed in a mold box and subsequently fitted into the mold casing (1) for reproduction of the article.

6 Claims, 4 Drawing Figures

METHOD OF FORMING A ARTICLE IN INJECTION MOLDING APPARATUS

This invention relates to a method of forming an article by means of an injection molding process and also relates to injection molding apparatus for carrying out the method.

It is already known to form articles, such as shoes from plastics materials by means of an injection molding process in which the plastics material, typically PVC or polyurethane, is injected into a mold formed by a metal die. The shape of the article, is, of course, defined by the internal contours of the die. It is sometimes desired to give the surface of the article a particular appearance or to have particular patterns impressed therein and this is ahcieved by provided an appropriate surface finish to the die by cutting the pattern into the surface of the die. Typically, this is carried out by electro etching the surface of the die or by machine or handworking of the die. However, the known methods, which all involve the "working" of the metal of the die do not enable a very high definition for a pattern on the finished article to be achieved. As a result, attempts to reproduce surfaces having fine detail, such as crocodile or lizard skin, have not been successful, the resultant finishes being relatively crude and unattractive.

The present invention seeks to provide a new method of forming a mold which overcomes the limitations of the known methods, particularly where elevated pressures and temperatures are adopted.

According to one aspect of the invention there is provided a method of forming an article by means of an injection molding process, said process consisting of the steps of placing a master pattern of said article, in a mold casing to define a mould space or cavity, between said master pattern and said casing, filling the mold space or cavity with a pourable, heat-resistant molding compound having minimal shrinkage on curing to form a mold corresponding to said master pattern and which is supported by said mold casing, removing the master pattern after opening the casing, closing the casing and injecting a molding material into the mold space or cavity to reproduce said article.

According to another aspect of the present invention there is provided a method of forming an article by means of an injection molding process, including the steps of, placing a master of said article in a mold box, filling the mould with a settable molding compound having minimal shrinkage on curing to form a mold of said master, inserting the mold of said master in a mould casing which is such as to support the mold, closing the casing and injecting a molding material into the mold to reproduce said article.

As suitable molding compound, an epoxy resin which cures at high temperature, such as that sold under the trade name FORMITE EH10 or a thermo-curing polyurethane may be used.

The present invention also provides an injection molding apparatus for carrying out the method, which comprises a mold casing in which is located a mould of a master pattern formed from a pourable heat-resistant molding compound having minimal shrinkage on curing, said mold being positioned for support in said casing, means for closing and opening the mold casing and means of introducing an injection molding material into the mold casing to reproduce the master pattern.

Preferably, location means are provided to locate and secure the mold in the mold casing. In one form, the location means may comprise a plurality of recesses in the mold casing in which projections on the mold are located. The projections in the mold may have embedded therein screw-threaded members, such as nuts which are engagable by similarly screw threaded members, such as screws or bolts, in the mold casing.

Alternatively, projections, which may be in the form of bolts secured to the mold casing, may be provided on the interior surface of the mold casing. In an alternative form, the location means is provided by a bonding agent applied to the interior of the mold casing whereby said mould of the master is bonded to the mold casing.

In a preferred embodiment of the method in accordance with the present invention when a two-part mold casing is used, the master is supported so as to be partially in a lower part of the casing with space between the master and the casing for the molding compound, the gap between the master and the lower part of the casing being sealed by a formable material adapted to give a removable seal, the upper part of the casing is placed on the lower part to close the mold casing and a molding compound is poured into the upper part to form an upper part mold insert, after this has cured the mould casing is inverted and opened, the formable material is removed, a release agent is coated on the thus exposed part of the upper part mold insert, the casing is closed and molding compound is poured into the second part of the mold casing to form the second part of the mold insert. Alternatively, the two parts of the mold insert may be bonded together, if desired for particular applications, by omitting the release agent and, if necessary coating the joint with a bonding agent.

The present invention also provides a novel construction of a two-part mold casing comprising a first wall on one of said parts and a second wall on the other of said parts spaced from said first wall when the mold is closed by a plurality of columnar elements being adapted to support the clamping forces securing the two mold parts together during a molding operation.

The invention will now be described by way of example with reference to the accompanying drawings in which.

Figure 1:
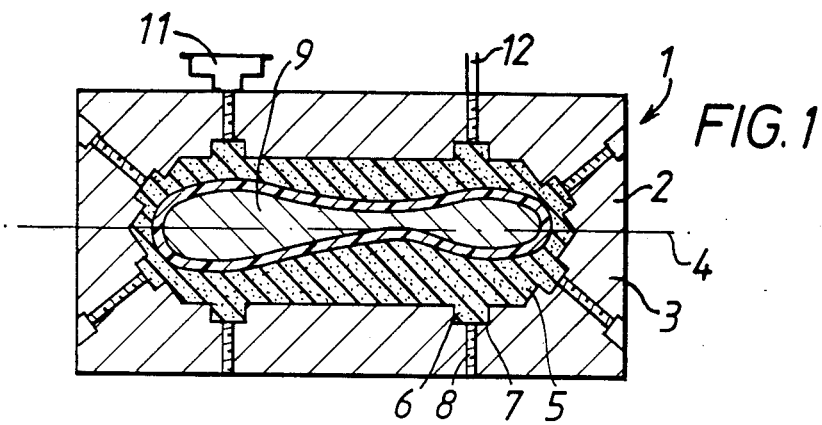
FIG. 1 shows a sectional end view of a mould casing.

FIG. 1 shows a schematic end view of a mold for an injection molding process having a rigid mold casing 1 formed of metal, and which is split into two parts 2 and 3 along a central plane 4. Within the mold casing there is located a mould 5 which is formed, by a method to be described hereinafter, of a pourable, heat-resistant molding compound such as an epoxy resin which is curable at an elevated temperature, for example that which is sold under the trade name FORMITE EH10, or of a thermo-curing polyurethane. The interior of the mold 5 defines accurately by the shape and surface contour of the article to be molded. The mold casing may, in certain circumstances, be made of non metallic material.

After being formed, the mold 5 is cut along a dividing line such that when it is placed in the mold casing, the dividing line will be aligned with the central plane 4 of the article. Preferably, the mold 5 is formed to be a snug fit in the casing so that its exterior surface is supported throughout by the interior of the mold casing 1.

Figure 2:
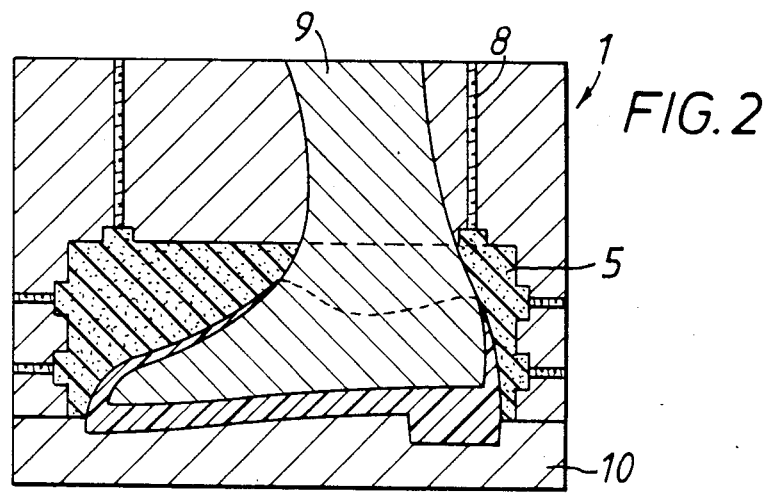
FIG. 2 shows a sectional plan view of FIG. 1.

To ensure that the mold 5 is accurately located in the casing 1 and secured in position in the embodiment shown in FIGS. 1 or 2 it is provided on its exterior surface with projections 6 which locate in associated recesses 7 in the casing 1. A screw threaded nut (not shown) may be embedded in some or all of the projections during the formation of the mold 5 and the mould casing 1 is provided with screw threaded studs or bolts 8 which engage the nuts to secure the mold 5 rigidly and immovably to the casing 1.

As shown more clearly in FIG. 2, this embodiment is intended particularly for the formation of an injection molded shoe and therefore the interior of the mold 5 is adapted to receive a last 9 so that the shoe is defined by the space beteen the last 9 and mould 5. The last 9 is secured in known fashion to the casing 1.

After the mold 5 has been secured to the two casing parts 2 and 3 and the last 9 has been secured in position, the mold casing 1 is closed by an end plate 10 which, in conjunction with the last 9, defines and closes the interior of the mold 5, the outline of the sole of the shoe together with any tread formation being formed in the end plate 10. The sole of the shoe could be defined by an additional part of the mold 5 which would be secured to the end plate 10, but in practice, the high definition provided by the mold 5 is not usually required for a sole. The shoe is then formed in a conventional way by means of an injection molding process in which a molding material such as polyvinyl chloride or polyurethane is injected by means of ram injection or extruder injection into the mould through one or more passages (not shown) in the end plate 10. The injection molding process follows conventional techniques, for example, using pressures of 281.23 Kg/cm$^2$ and a temperature of 180° C.

The mold 5 is formed by placing a master pattern of the article to be formed, a shoe in the present example, in a two-part mold casing 1, having the two mold halves 2 and 3. The present invention is particularly applicable to the formation of shoes having a fine surface pattern or ornamentation such as is found on crocodile skin or lizard skin. A shoe made of the natural material which is to be reproduced forms a master pattern which, after being coated with a release agent, is supported on a last in the casing so as to lie half in the lower part 3 and half in the upper part.

In this way, the parting line in the finished article (the shoe) extends along the centre line of the shoe. The upper casing part 2 is removed and the gap between the edge of the master pattern and the wall of the mold casing part 3 is sealed with a formable sealing compound to close off the (empty) lower interior of the casing part 3. The formable sealing compound may be clay, putty, silicon rubber or similar material such as that sold under the trade mark "PLASTICENE", designed to give a removable seal. The top surface of the sealing compound is levelled flush with the top edge of the casing part 3, i.e., to lie on the parting line 4. The mold casing is then closed. The heat-resistant molding compound, is then poured into the upper part 2 through the reservoir 11 until it fills the mold casing part 2 and enters the outlet vent 12. The molding compound is then cured in the known way.

When the molding compound is set, it can be removed from the mold casing and thus forms a mold of the master pattern to be inserted in the mold casing for reproduction of the article to be reproduced, in this case a shoe.

After the molding compound has cured the mold casing is inverted, opened and the formable sealing compound is removed. The region covered by the sealing compound is cleaned using a solvent such as ethylalcohol. The exposed surface of the mold insert is coated with a release agent. The casing is then closed and, in a similar manner to the first stage, molding compound is poured into the casing part 3 (which is now uppermost) to form the second part of the mold insert. When this part has cured the casing is opened, the master pattern is removed and the mold casing used to mass produce reproductions of the master.

Figure 3:
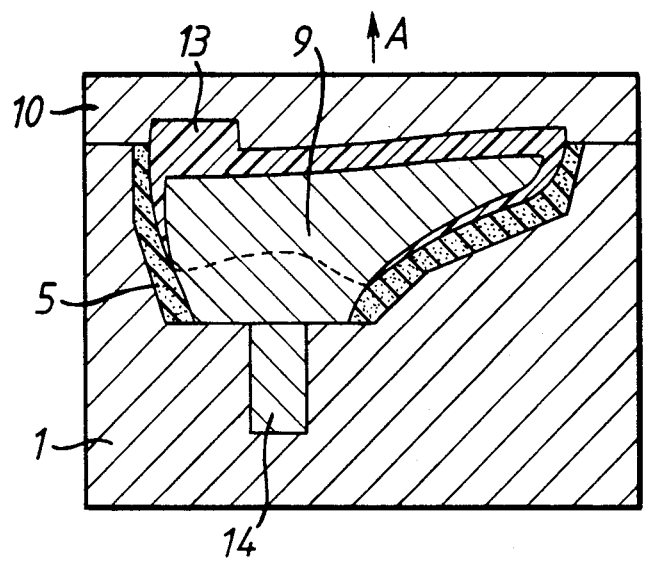
FIG. 3 shows a sectional plan view of a further embodiment of the invention.

FIG. 3 shows a modified embodiment in a view corresponding to that of the embodiment illustrated in FIG. 2. In this embodiment the mold is formed in one piece directly in the mold casing 1 which is closed by an end plate 10. The master of the shoe is supported in the casing 1 on a suitable last 9 and the molding compound is poured through an inlet (not shown) into the space between the mold casing and the shoe where it sets to form the mold 5.

The shoe and last are then removed and since the mold is formed of a resilient material, it has a tendency to be compressed when subjected to pressure. The thickness of the mold 5 is then to be controlled within predetermined limits throughout its profile so as to reduce the tendency to compression when the final molding compound is injected into the mold.

The interior of surface of the mold casing 1 is suitably prepared to receive the molding compound and this may be achieved by treating the surface so that the mold bonds directly thereto or by coating it with a bonding agent prior to pouring the molding compound. It will be appreciated that the mold could be formed in a separate casing for subsequent bonding to the mold casing 1.

After being removed from the mold casing, the mold is cut with a very fine cutting means, such as a sharp blade or a laser beam along its centre line so that one half can be secured in the casing part 2 of the mold casing 1 and the other part in the corresponding mold part 3. The two parts of the mold 5 mate accurately in the mold casing, so that the normal flash line which is usually obtained in the molding process is virtually eliminated, so improving the appearance of the finished article.

An article is formed in a subsequent injection molding operation.

The last 9 is located in the casing 1 by means of a spigot 14. With this arrangement, the last 9 is removable in the direction of arrow A as is the final product, the article 13. This embodiment is particularly suitable for the mass production of three dimensional hollow articles such as over-reach boots for horses, and handbags.

It has been found that the use of the mold insert from the high definition molding compound enables the finest detail on the master pattern to be transferred to the reproduced article, so that it is possible to reproduce by injection molding processes, a realistic reproduction of fine detail such as that of crocodile or lizard skin.

Although described with reference to the injection molding of footwear, it would be readily appreciated that the present invention is easily applicable to the injection molding of other articles where a high surface definition is required for a pattern or profile on the finished article, such as imitation leather goods or a wide range of other articles such as toys and scale models. It will also be understood that many variations may be made within the general concept of providing a mold insert formed from a master pattern by means of a particular choice of molding compound.

Figure 4:
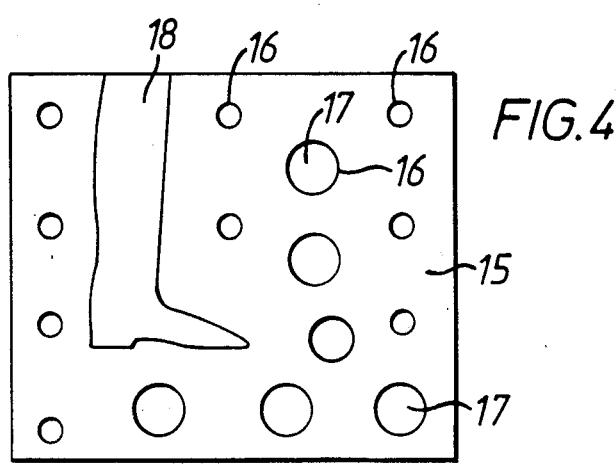
FIG. 4 shows a representation of a novel form of a mold casing.

The invention also provides a novel form of construction of a molding casing, as shown in FIG. 4 schematically. The casing has a lower part consisting of a first lower wall 15 having therein a plurality of punched holes 16 which are adapted to receive, and have secured therein by welding or the like, associated columns 17. The columns 17 abut an upper wall (not shown) which forms part of the upper part of the mold casing. A last 18, suitably shaped for the article to be molded, is located in the casing and the space between the walls 15 between the columns is filled with epoxy resin molding compound. The clamping forces necessary to hold the two parts of the mold casing together during a molding operation are supported by the columns. As substantially all of the forces are carried by the columns, which typically are formed of steel bar-stock, the remainder of the casing is relatively unstressed and can be made very economically. The mold insert is formed in the same way as described earlier.

The interior surface of the mold 1 is suitably prepared to receive the molding compound and this may be by treating the surface so that the mould bonds directly thereto or by coating it with a bonding agent prior to pouring the molding compound although a releasable mold insert may be used instead.

It will be appreciated that the mold 5 may be formed in a separate casing for subsequent bonding to the mold casing.

What is claimed is:

1. A method of forming an article by means of an injection molding process, said process consisting of the steps of placing a master pattern of said article in a mold casing to define a mold space or cavity, between said master pattern and said casing, filling the mold space or cavity with a pourable, heat-resistant molding compound having a minimal shrinkage on curing to form a mold insert corresponding to said master pattern and which is supported by said mold casing, removing the master pattern after opening the casing, closing the casing and injecting a molding material into the mold space or cavity to reproduce said article, wherein the mold casing comprises an upper part and a lower part, the master pattern being supported so as to be partially in the lower part of the mold casing and so as to define a space for the molding compound between the master pattern and the wall of the casing, sealing the space between the master pattern and said lower part of the casing by means of a deformable material adapted to give a removable seal, placing the upper part of the casing on the lower part to close the mold casing and pouring the molding compound into the upper part of the mold casing to form a first part of the mold insert, curing the molding compound, inverting and opening the mold casing, removing the deformable seal material, coating the exposed surface of the mold insert with a release agent, closing the casing and pouring the molding compound into the second part of the mold casing to form a second part of the mold insert.

2. A method according to claim 1 wherein the moulding compound is a settable material having a co-efficient of thermal expansion which is substantially similar to that of the mould casing.

3. A method according to claim 1 or claim 2 wherein the moulding compound is an epoxy resin.

4. A method according to claim 1 or claim 2 wherein the moulding compound is a polyurethane.

5. A method according to claim 1 or claim 2 wherein the moulding compund is silicone rubber.

6. A method according to claim 1 wherein the two parts of the mould insert are bonded together in the absence of a release agent.

* * * * *